United States Patent [19]
Reitz et al.

[11] Patent Number: 5,829,656
[45] Date of Patent: Nov. 3, 1998

[54] VEHICULAR MOUNTING APPARATUS

[76] Inventors: Daniel J. Reitz; Mary C. Reitz; Harry J. Reitz, all of 304 Woborn, Schaumburg, Ill. 60173

[21] Appl. No.: 517,077

[22] Filed: Aug. 21, 1995

Related U.S. Application Data

[63] Continuation of Ser. No. 131,781, Oct. 4, 1993, abandoned.

[51] Int. Cl.⁶ .................................................. B62J 11/00
[52] U.S. Cl. ...................... 224/417; 224/420; 224/436; 224/463; 224/572; 224/250; 294/154
[58] Field of Search ..................... 224/417, 420, 224/436, 463, 572, 250; 206/493, 315.1; 294/153, 154

[56] References Cited

U.S. PATENT DOCUMENTS

| | | | |
|---|---|---|---|
| 206,928 | 8/1878 | Butler | 294/154 |
| 610,288 | 8/1898 | Streeper | 224/34 |
| 841,902 | 1/1907 | Shumard | 294/154 |
| 2,384,285 | 9/1945 | Deutsch | 224/42.46 R |
| 3,888,397 | 6/1975 | Koizumi . | |
| 3,955,728 | 5/1976 | Jackson et al. . | |
| 4,226,347 | 10/1980 | Rice | 224/36 |
| 4,282,279 | 8/1981 | Strickland | 224/32 R |
| 4,483,380 | 11/1984 | Beran | 206/315.1 |
| 4,540,219 | 9/1985 | Klinger | 297/487 |
| 4,805,937 | 2/1989 | Boucher et al. | 224/42.46 R |
| 4,852,778 | 8/1989 | Beiser . | |
| 4,881,746 | 11/1989 | Andreesen | 224/42.46 R |
| 5,052,704 | 10/1991 | Nauman | 224/35 |
| 5,110,020 | 5/1992 | Uhl . | |
| 5,207,360 | 5/1993 | Stine . | |

*Primary Examiner*—Linda J. Sholl
*Attorney, Agent, or Firm*—James W. Potthast; Stephen A. Litchfield

[57] ABSTRACT

A vehicular mounting apparatus (10) for mounting articles (16, 18, 20, 25, 22) to an elongate frame member (14) of a bicycle (12) has an elongate, resilient, tubular padding member (30) with a split (32) to laterally wrap around the frame member (14) and a flexible, protective base member (34) coextensively wrapped around and secured by a pair of opposed mating connectors (44, 46), the padding member (30) and a plurality of flexible fastening straps (24) adjustably carried by loops (38) to releasably mount these articles of different sizes and shapes to the base member (34), and a handle (40) for use as a manual carrying apparatus.

23 Claims, 4 Drawing Sheets

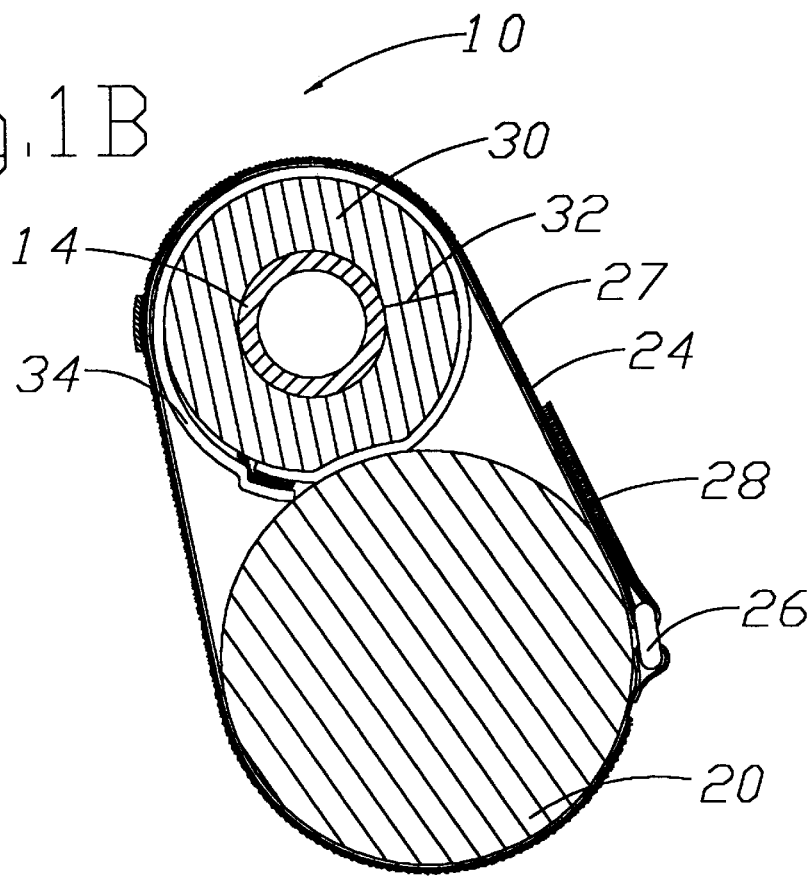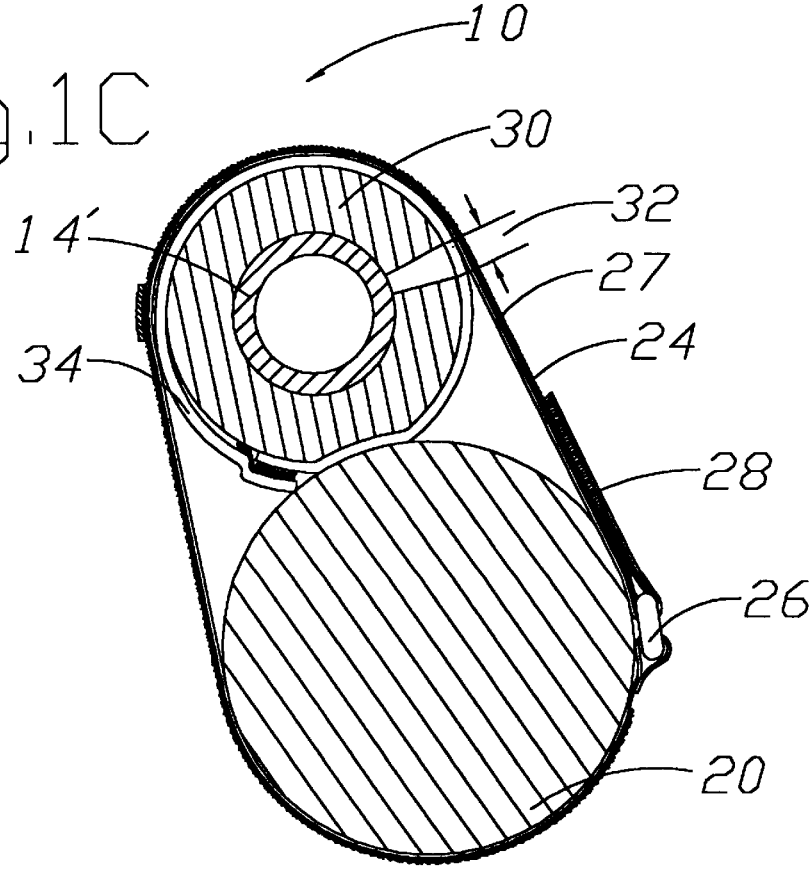

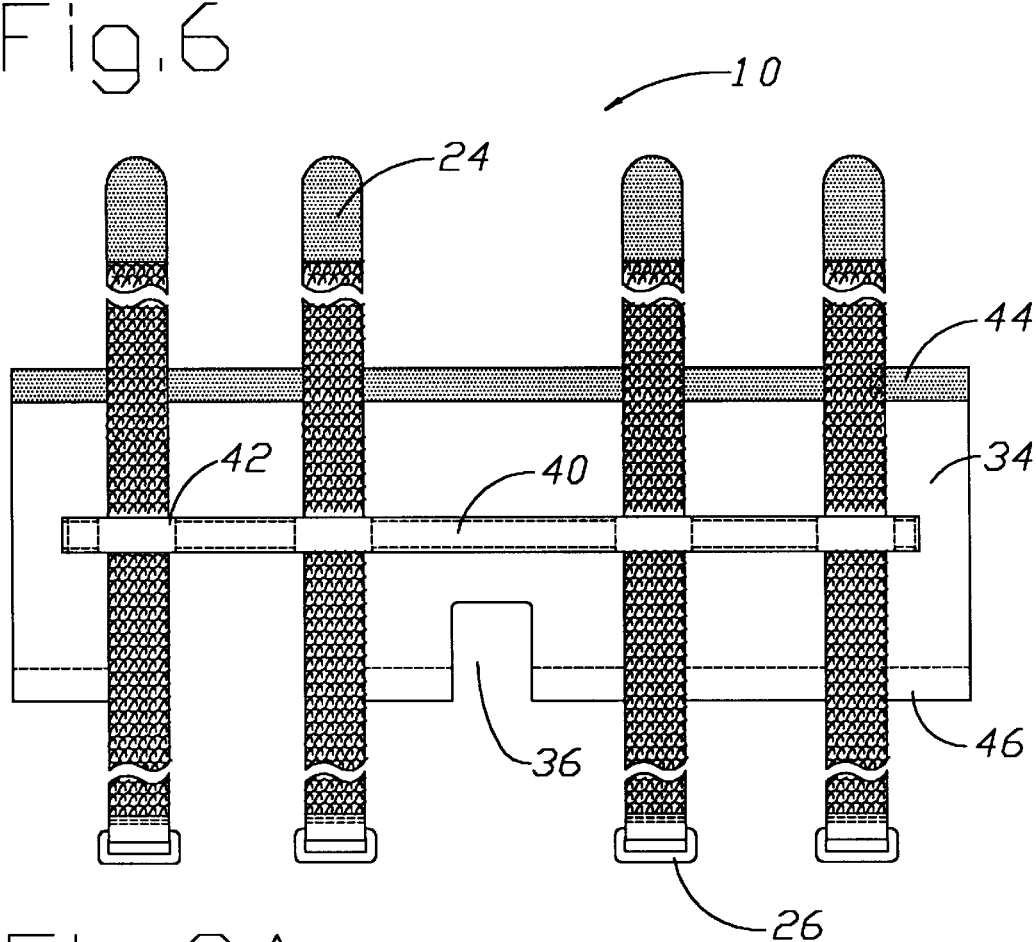
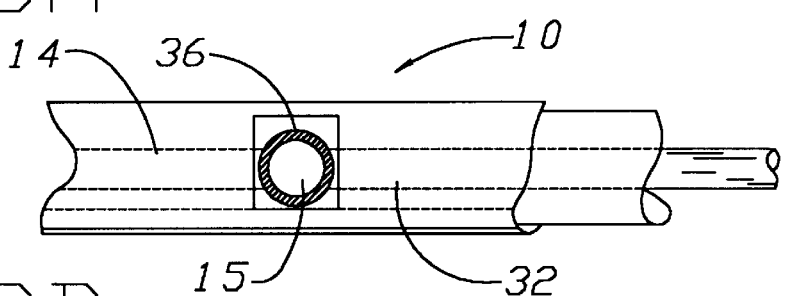
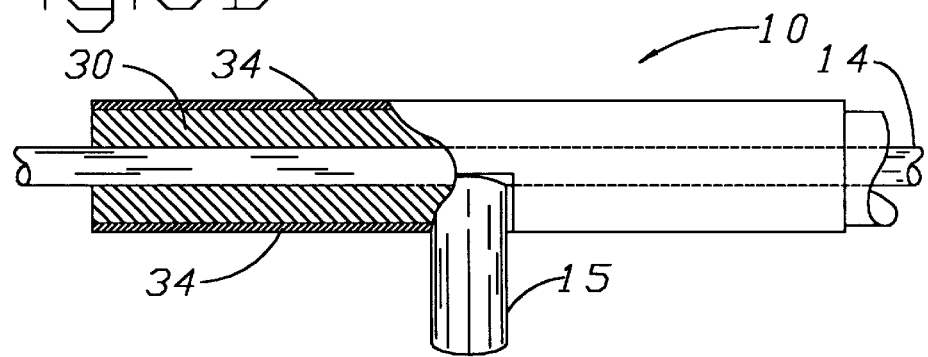

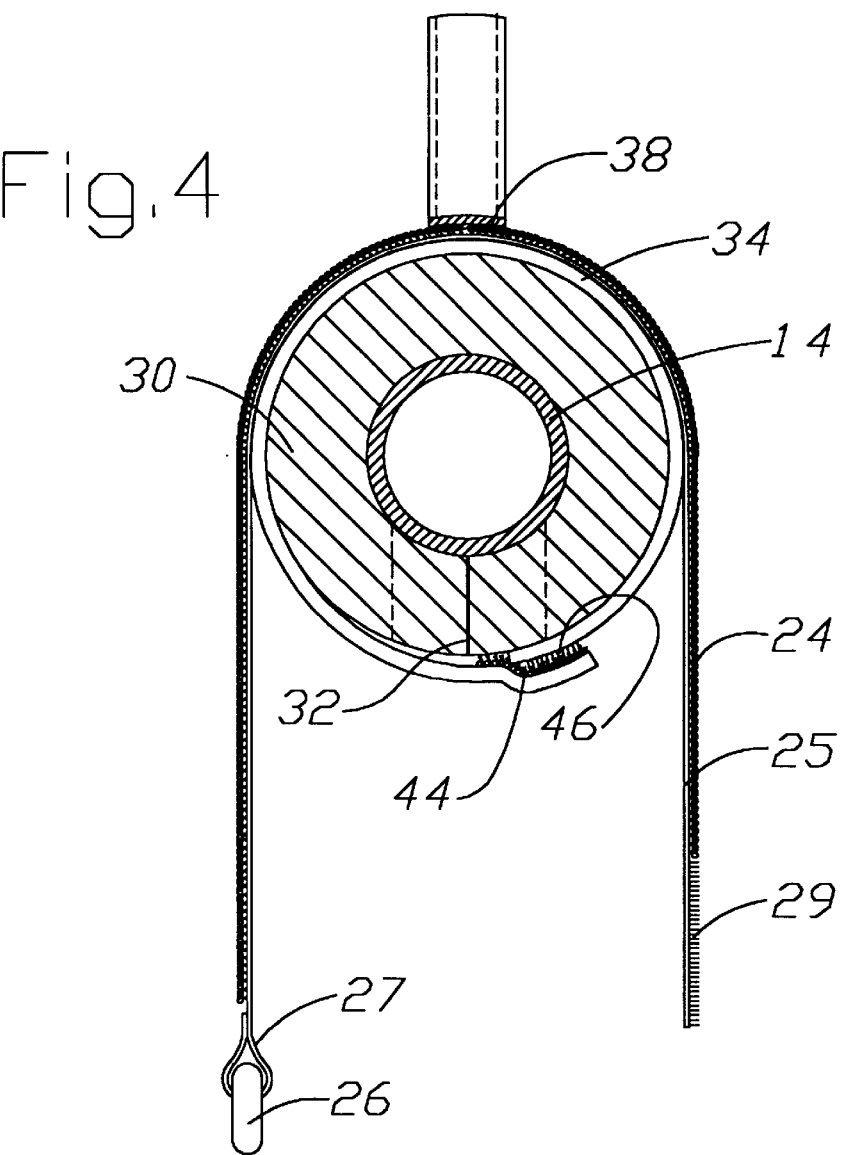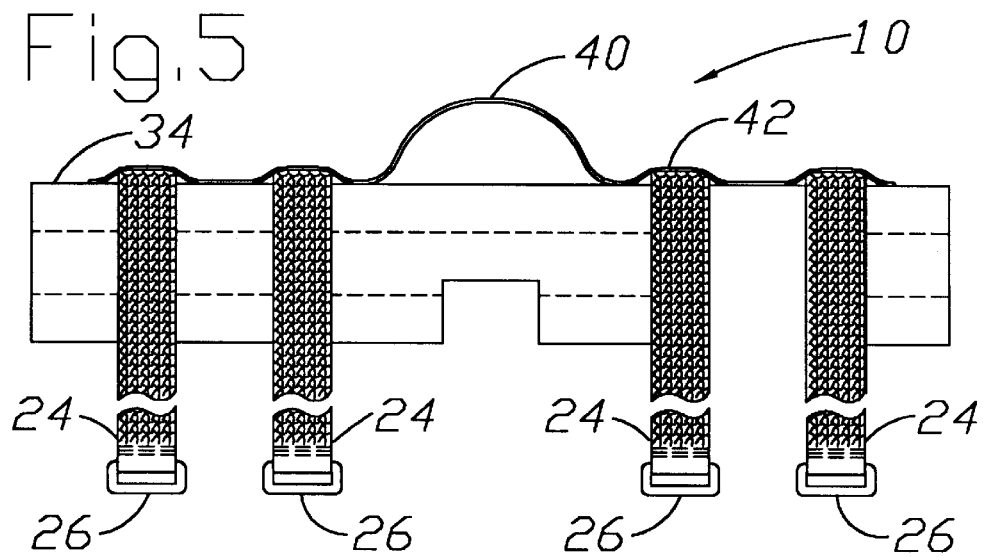

VEHICULAR MOUNTING APPARATUS

This application is a continuation of application Ser. No. 08/131,781, filed Oct. 4, 1993 now abandoned.

BACKGROUND OF THE INVENTION

1. Field of the Invention

This invention relates to a device for releasably mounting articles to a vehicular frame such as to an elongate frame member of a bicycle or baby stroller.

2. Description of Related Art Including Information Disclosed Under 37 CFR §1.97–1.99

There are many devices available for carrying items on a bicycle including bags made from a variety of materials including lattices, netting and webbing. These known bags are provided many different types of attachment devices for securing the bag to the vehicle including straps, buckles, hoops and loops.

An example of a device for carrying balls on a bicycle is U.S. Pat. No. 5,207,360 issued May 4, 1993 to Stine which illustrates a webbing device for securing a ball to the handlebars of a bicycle. While this device enables the rider of a bicycle to carry a ball, it is not readily adaptable for use with items other than balls. The utility of this ball bag is therefore rather limited.

In U.S. Pat. No. 5,110,020 issued May 5, 1992 to Uhl, a tote bag for use with a bicycle for carrying a bottle is shown. The bag is held to the support rail of the bicycle by means of straps of flexible material. Again, this tote bag is rather limited in its capacity for carrying a wide variety of items in that it is able to carry only items in a small pouch together with a bottle for water or other fluid.

U.S. Pat. No. 4,852,778 issued Aug. 11, 1989 to Beiser et al. illustrates a combination bicycle bag and hand bag which fits over the handlebars of a bicycle, has a zippered top and a round, cylindrical shape. Disadvantageously, this bag is unable to carry elongated items such as baseball bats or large balls such as basketballs or soccer balls.

In U.S. Pat. No. 3,888,397 issued Jun. 10, 1975 to Koizumi, a bicycle bag which fits over the handlebars of a bicycle is shown to have a zippered top for securing items carried within the bag. Like the other bags, this bag is also unable to carry elongated items or large balls.

In U.S. Pat. No. 3,955,728 issued May 11, 1976 to Jackson et al., another handlebar bag is shown with a zippered top and a cylindrical shape for carrying a relatively small number of items. As with the bag of Beiser, this bag is designed for removal from the bicycle for carrying by person.

Thus, all the known vehicle mounting devices are relatively limited in scope with respect to the size and shape of items that may be carried on a bicycle. Most are limited to carrying only smaller items which would fit inside a bag or other limited container and is then attached to the handlebars or support rail of the bicycle. In addition, none of them enhance the safety when used with a bicycle or the like.

SUMMARY OF THE INVENTION

It is therefore the principal object of the present invention to provide a vehicular mounting apparatus for releasably mounting an article to an elongate vehicular frame member of a vehicle which overcomes the problems and disadvantages of known carrying apparatus noted above and enhances rider safety.

This object is achieved in part by providing a vehicular mounting apparatus for releasably mounting an article to an elongate vehicular frame member of a vehicle comprising a base member, means for mounting the base member to the elongate frame member and means for releasably fastening the article to the base member including at least one flexible fastening member mounted to the base member in and wrappable around articles of different size.

Also, the object of the invention is achieved by providing a vehicular mounting apparatus for releasably mounting an article to an elongate frame member of a vehicle, comprising an elongate protective padding member with a flexible body wrappable at least partially around the elongate vehicular frame member and a flexible fastener having a flexible fastening member with a length sufficient to wrap around the elongate padding member and the article when the padding member is at least partially wrapped around the elongate frame member to secure the article pressed against the body of the elongate padding member by the flexible fastening member.

Also, the object of the invention is obtained by provision of a vehicular mounting apparatus for releasably mounting an article to an elongate vehicular frame member, comprising an elongate padding member with a flexible body wrappable at least partially around the elongate vehicular frame member to mount the padding member to the vehicular frame member, a protective base member to protectively cover the elongate padding member and means carried by the protective base member for releasably mounting the article to the protective base member.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which:

FIG. 1B is a sectional side view of the vehicular mounting apparatus taken along section line IB—IB of FIG. 1A;

FIG. 1C is an enlarged cross-sectional view of the preferred embodiment of the vehicular mounting apparatus like that of FIG. 1B but with the mounting apparatus being carried by a vehicular frame member larger than that of FIG. 1B and larger than the tubular passageway through the padding member to illustrate the adaptability of the vehicular mounting apparatus to different sized frames;

FIG. 3A is a bottom view of a section of the vehicular mounting apparatus showing a slot for receipt of transverse members for interlocking the mounting apparatus against relative movement;

FIG. 3B is a side, part sectional view of the vehicular mounting apparatus secured to the handlebar and steering column of the bicycle;

FIG. 4 is an end sectional view of the vehicular mounting apparatus to illustrate the overlapping base member and strip when not in a wrapped relationship with the base member and frame;

FIG. 5 is a side view of the vehicular mounting apparatus illustrating the longitudinal arrangement of the fastening members, or straps, the loops and the manual carrying handle; and FIG. 6 is a plan view of the vehicular mounting apparatus with the protective base laid out in a plane to illustrate to combination of the carrying handle and loops and also to more clearly show the interlocking slot also illustrated in FIGS. 3A and 3B.

DESCRIPTION OF THE PREFERRED EMBODIMENT

Figure 1A:
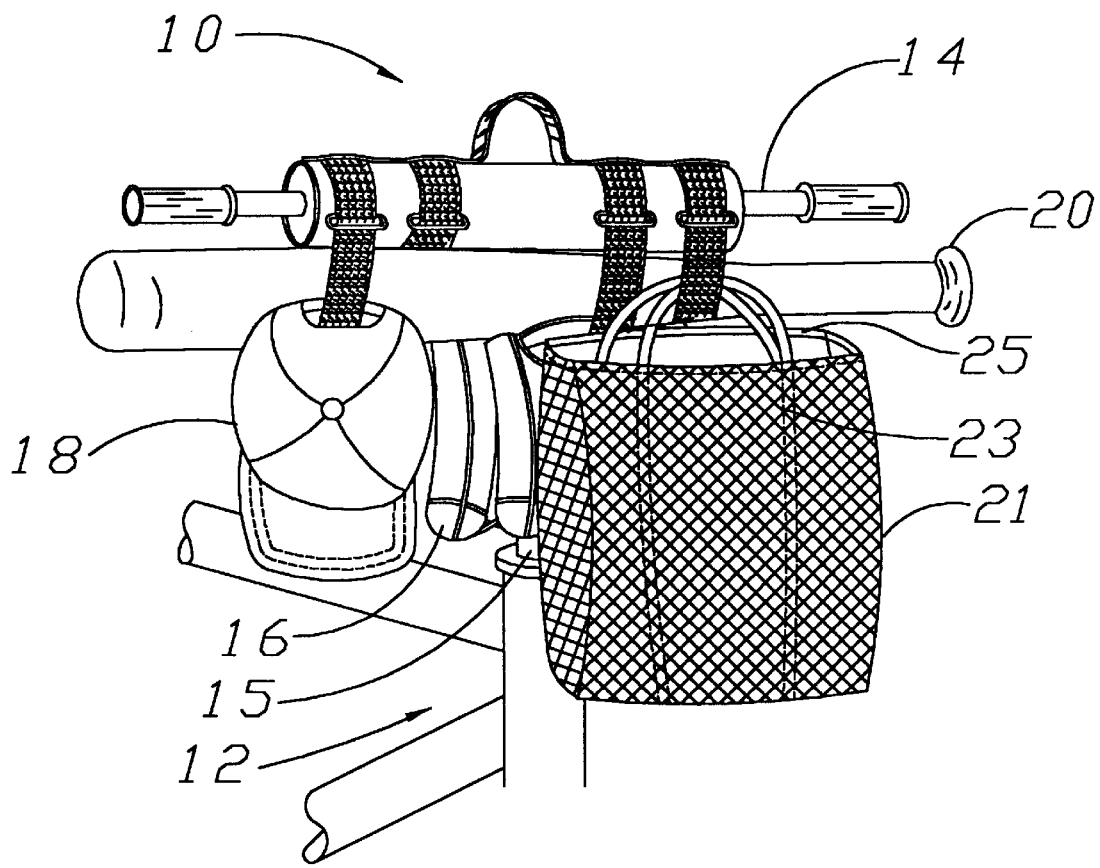
FIG. 1A is a perspective view of a preferred embodiment of the vehicular mounting apparatus attached to the handlebars of a bicycle and being used to carry a number of items of different size and shape.

Referring to FIG. 1A, a preferred embodiment of the vehicular mounting apparatus, or tote, 10 is shown as releasably secured to a vehicular frame member such as handlebars 14 of bicycle 12. As seen, tote 10 has releasably secured thereto a number of items of different size and shape including a baseball mitt 16, a cap 18, and a baseball bat 20. While only these items are shown for example, many other items such as large U-shaped bicycle locks, coiled cables, towels, spare clothing, tennis rackets, swim fins, etc. suited for being carried because of the generally universal fastening capability of the tote 10.

The mounting apparatus 10 is centrally mounted over the handlebars 14 of bicycle 12 such that the weight of the items carried on the tote is evenly distributed over the center of gravity of the bicycle on either side of the steering column 15. Alternatively, the tote 10 is carried by another vehicular frame member. This enables a rider of the bicycle to maintain balance while carrying a variety of different shaped and sized items in a safe manner. Also, shown attached releasably to the vehicular mounting apparatus 10 is a ball bag 21 to carry a large ball such as a basketball or soccer ball. The bag is preferably made of a mesh nylon material and has a pair of dual support straps 23 sewn therearound and a contact interconnective cloth fastener, such as Velcro™ cloth or a zipper closure 25 to keep the ball in the bag 21 while riding the bicycle 12. Alternatively, the ball bag 23 is made of resilient mesh material which stretches over different size balls to hold them snug against the tote 10.

Figure 2:
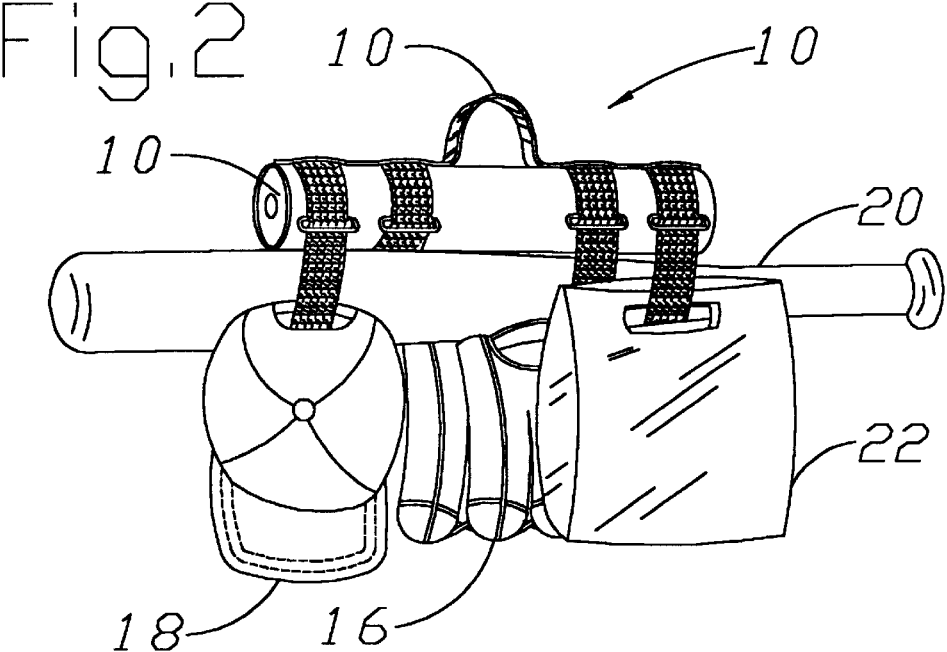
FIG. 2 is a perspective view of the vehicular mounting apparatus after removal from the bicycle handlebars for manually carrying the items secured thereto by means of a handle.

FIG. 2 illustrates the tote 10 disengaged from bicycle 12 for use in manually carrying a variety of items when not used in connection with the bicycle 12 or other vehicle. Thus, the tote 10 also serves as a means for carrying a variety of items from the bicycle 12 to a place of use, such as a ball field or other place to which one may ride a bicycle, by means of a handle 40.

As seen in FIG. 2, the tote 10 is releasably carrying a baseball mitt 16, baseball cap 18, baseball bat 20 and a carrying bag 22. Bag 22 is a bag designed of cloth for the purpose of carrying loose or smaller items. Also, bag 22 serves for storage of the entire tote 10 when not used. Preferably, bag 22 is made of a nylon, plastic or other whole cloth that is weatherproof and sturdy.

Referring now to FIG. 1B, a baseball bat 20 is seen secured to the tote 10. Tote 10 has a plurality of releasable fastening straps shown secured around bat 20 and held in place by buckles 26 and mating connectors 28, preferably contact interconnective cloth, such as Velcro™ cloth. The top section 27 of straps 24 carries a cloth material that mates with the cloth material of a bottom part 28 to form a secure connection. A significant portion of each of the straps 24 contains mating connector cloth 25 to allow the securing strap 24 to adjust for a variety of different sized objects.

Safety and securable mounting is enhanced by a tubular padding member 30. The padding member 30 is secured around the handlebar 14 of the bicycle 12 is preferably made of resilient material, such as foam rubber, and is preferably secured to the underside of the base member by adhesive or other suitable means. The resilient padding protects against bodily injury from impacts against the handlebars or other frame member 14 as well as enabling resilient securement of the articles. An elongate slit 32 enables the tubular body to be laterally slipped around at least part of handlebars 14. A base member 34 having a planar generally rectangular flexible body 34 is preferably made of a pliable, flexible and durable material such as nylon or vinyl to protect the exterior surface of the padding member and provide a base for attachment of articles by means of by the straps 24 carried by the base member. Straps 24 are adjustably secured to the body of the base member 34 by means of loops 38 to allow for adjusting the straps 24 and location of the buckles 26 for different sized items carried by the tote 10. Because the padding member 30 is resilient, it is deformed and resiliently presses against the side of the bat 20 for a secure tight fit to reduce rattles. As seen in FIG. 1C, the resiliency of padding member 30 enables the opposed ends on opposite side of the elongate slit 32 to be separated to fit over a frame member 14' which is larger than interior cylindrical surface of the tubular body of padding member 30 conforming to handlebar frame member 14 of FIG. 1B. The base member is dimensioned to still overlap even when the tote 10 is carried by a larger frame member 14'.

Referring now to FIGS. 3A and 3B, a section of tote 10 is shown releasably wrapped around a frame member, such as handlebar 14, and steering column 15 of a bicycle 12. As seen in FIG. 6, the base member has at least one slot 36 for receipt of the transversely connected steering column 15. The padding member 30 has a corresponding aligned slot (not shown). With this other transverse frame member received and held within the slot 36, the body of the protective base 34 and the padding member are locked against relative longitudinal and rotary movement with respect to the handle bars 14 for enhanced safety.

FIG. 3B illustrates in further detail the assembly of the tote 10 mounted around handlebars 14 and steering column 15 of the bicycle 12. It can be seen that the padding member 30 is coextensively covered by the body of the base member 34. As noted, the handlebar 14 is covered in a manner that provides for additional safety for a rider of the bicycle. This additional safety comes from the increased cushioning of the handlebars by the base member 30 in the event of a mishap.

FIG. 4 shows in sectional end view, one of the straps 24 adjustably secured by a loop 38 to the base member 34. Base member 34 is wrapped around padding member 30 which, in turn is mounted at least partially around handlebars 14. Mating connectors 44 and 46, preferably contact interconnective cloth, are provided at the opposed ends of the base member 34 to keep it in wrapped relationship. The straps 24 carry buckles 26 and are suspended from loop 27. The placement of the mating contact interconnective cloth connectors 25 and 29 on strap 24 provides for a large degree of flexibility in securing strap 24 through buckle 26 to fit a large variety of different shaped items.

As seen best in FIG. 5, the tote 10 preferably has two pairs of straps 24 spaced along the length of the base member 34. Preferably, the straps 24 are symmetrically located on opposite sides of the slots 36. A carrying strap 40 is secured to the base member 34 so that when tote 10 is removed from bicycle 12, it is usable as a manual carrying apparatus for merely carrying a variety of objects to or from a playground, ball field or other place. The loops 38 and the carrying strap 42 are all formed by means of a strap of cloth fastened at appropriate locations along base member 34.

The straps 24 are preferably of equal lengths with an optimum length of approximately twelve inches.

Alternatively, varying lengths of straps 24 are provided both shorter and longer than the optimum length.

Referring again to FIG. 6, a pair of mating connectors, preferably contact interconnective cloth, are carried adjacent opposite edges of and on opposite sides of the base member 34. The base member 34 is wrapped around padding member 30 and releasably secured in wrapped relationship by means of mating connectors 44 and 46. The mating connectors 44 and 46 are substantially coextensive with the opposed edges to interconnect the opposed positions of the body of the base member at a plurality of different locations along the opposed edges.

While the foregoing description has been related to use on a bicycle, the inventive concept applies equally well to any type of a vehicular device having an elongate frame member. Items such as baby strollers, carriages or shopping carts are ideal for use with tote 10. Further, while there is shown and described the present preferred embodiment of the invention, it is to be distinctly understood that this invention is not limited thereto but may be applied in a variety of ways. For example, the means for securing the base member 34 to the padding member 30 is alternately a zipper or snap rather than contact interconnective cloth, as shown. Also, alternately, the buckles 26 are replaced with snaps, hooks and eyelets or other adjustable means. Also, although four are preferred, it is believed that the tote 10 is capable of working well with more or less straps 24 depending on the application and the length of the padding member 30. While a plurality of straps have been shown, a single strap or even a different type of fastener could be employed in conjunction with the base and padding members. In lieu of nonresilient straps with buckles, it is contemplated that resilient straps, such as made from so-called bungee cord, be employed. Also, although a singular rectilinear slot is shown interlocking with a transverse frame member, a pair of opposing slots can also be employed and the slots may be provided with a curved base to conform to the cylindrical shapes of vehicular frame members. Reference should therefore be made to the appended claims which define the scope of this invention.

We claim:

1. A vehicular mounting apparatus for releasably mounting an article to an elongate vehicular frame member of a vehicle, comprising:
    a base member having a planar flexible body wrappable at least partially around the elongate vehicular frame member, said planar flexible body having at least one slot for receipt of another vehicular frame member transversely connected with the one elongate vehicular frame member to interlock the planar flexible body against longitudinal movement along the one elongate vehicular frame member and against rotary movement around the elongate vehicular frame member when the planar flexible body is wrapped therearound;
    means for mounting the base member to the elongate frame member said member including means for releasably securing the body in wrapped relationship with the elongate frame member, said releasably securing means having a pair of mating connectors for releasably interconnecting opposed portions of the body and are releasably engageable with one another in different adjustable positions to selectively secure the body in firmly wrapped relationship with vehicular frame members of different sizes;
    means for releasably fastening the article to the base member including at least one flexible fastening members mounted to the base member and wrappable around articles of different size such that said flexible fastening member assists in holding said planar flexible body in wrapped relationship around the elongate vehicular frame member, and such that the flexible fastening member is also wrappable around the base member and releasably fastens the article when wrapped around the elongate vehicular member, said flexible fastening member is an elongate strap carrying mating connectors to secure the straps in wrapped relationship with respect to the article and base member when mounted to the elongate frame member, said flexible strap is mounted to the base member by means for adjustably holding the strap to the base member including a pair of loops carried by the base in spaced relationship for sliding receipt of a pair of straps; and
    an elongate padding member mounted to an underside of the base member in which the elongate padding member is an elongate tube of resilient material with an elongate split for receipt therethrough of the elongate vehicular frame member.

2. The vehicular mounting apparatus of claim 1 in which said mating connectors are made of mating pieces of contact interconnective cloth carried adjacent opposed edges of and on opposite sides of the body for mating engagement when the body is in wrapped relationship with the elongate frame member.

3. The vehicular mounting apparatus of claim 1 in which the mating connectors are substantially coextensive with the opposed edges to interconnect the opposed portions of the body at a plurality of different locations along the opposed edges.

4. The vehicular mounting apparatus of claim 1 including another flexible fastening member mounted to the base member on one side of the slot opposite the one flexible fastening member on the other side of the slot in which the flexible fastening members are spaced apart on opposite sides of the slot.

5. The vehicular mounting apparatus of claim 1 including a manual carrying handle attached to the base member and adjusted to extend in the elongate direction of the vehicular frame member when the base member is wrapped around the vehicular frame member.

6. The vehicular frame member of claim 5 in which the handle is defined by an elongate strap which is attached at preselected spaced locations to the base member to form both the handle and at least one loop for releasably adjustable receipt of the flexible fastening member.

7. The vehicular mounting apparatus of claim 1 including another flexible fastening member mounted to the base member in spaced relationship with the one flexible fastening member to cooperate therewith for fastening elongate objects extending therebetween.

8. The vehicular mounting apparatus of claim 7 including another pair of flexible fastening members mounted to the base member in spaced relationship with the one and the other fastening member to provide fastening capability along a substantial portion of the entire length of the base member.

9. The vehicular mounting apparatus of claim 1 in which the strap carries a buckle to facilitate tightening of the strap.

10. The vehicular mounting apparatus of claim 1 in which the strap carries pieces of mating contact interconnective cloth along a length of the strap for adjustable relative interconnection of opposed ends of the straps in wrapped relationship with the base.

11. A vehicular mounting apparatus for releasably mounting an article to an elongate frame member of a vehicle, comprising:

an elongate protective padding member of a relatively fragile foam material with a flexible body wrappable at least partially around the elongate vehicular frame member and in which the elongate protective padding member has a slot for receipt of another frame member transversely interconnecting with the one elongate vehicular frame member to facilitate wrapping of the padding member around the elongate vehicular frame member and to interlock the padding member against longitudinal movement along the elongate vehicular frame member; and a flexible fastener having a flexible base for protectively covering the padding member and a plurality of spaced apart flexible fastening members along the length of the padding member with a length sufficient to wrap around the elongate padding member and the article, when the padding member is at least partially wrapped around the elongate frame member, said flexible fastening members to assist in holding the elongate padding member in wrapped relation to the elongate frame member and said flexible fastening members to secure the article in a pressed relationship against the body of the elongate padding member and in which the flexible base member includes means for mounting the flexible fastening members along the length of the flexible fastener.

12. The vehicular mounting apparatus of claim 11 in which the flexible body is resilient to resiliently hold the article between the body and the flexible fastening members.

13. The vehicular mounting apparatus of claim 11 including a manual carrying handle attached to the base member and adjusted to extend in the elongate direction of the vehicular frame member when the base member is wrapped around the vehicular frame member.

14. The vehicular frame member of claim 13 in which the handle is defined by an elongate stump which is attached at preselected spaced locations to the base member for offering both the handle and loops for releasably adjustable receipt of the flexible fastening members.

15. The vehicular mounting apparatus of claim 11 in which the flexible base member has means for securing the base in snugly wrapped relationship with the elongate protective padding member.

16. The vehicular mounting apparatus of claim 11 in which the flexible fastening member has a buckle to facilitate tightening of the flexible member wrapped around the padding member.

17. The vehicular mounting apparatus of claim 11 in which the fastener includes means for securing the flexible fastening member in lightly wrapped relationship with the elongate padding members.

18. The vehicular mounting apparatus of claim 11 in which the padding member is a resiliently in the form of a tube with an elongate slit for receipt therethrough of the elongate vehicular frame member of different size.

19. A vehicular mounting apparatus for releasably mounting an article to an elongate vehicular frame member comprising:

an elongate padding member with a flexible body wrappable at least partially around the elongate vehicular frame member to mount the padding member to the vehicular frame member;

a protective base member to protectively cover the elongate padding member, said base member having a flexible planar body wrapped at least partially around the elongate padding member and having mating connectors at opposed edges to maintain the planar body in wrapped relationship with the elongate padding member, said padding member having an elongate tubular body with an elongate split therein to resiliently receive therethrough the elongate vehicular frame member and the protective base member having a flexible body wrappable around the split and the padding member has at least one slot for receipt of another frame member transversely connected with the elongate vehicular frame member to interlock the padding member against longitudinal movement around the elongate vehicular frame member; and means carried by the protective base member for releasably mounting the article to the protective base member, said means for releasably mounting the article to the protective base member including at least one flexible, elongate fastening member mounted to the base member and wrappable around articles of different size, such that said flexible fastening member assists in holding said protective base member and said elongate padding member in wrapped relationship around said elongate vehicular frame member when wrapped around the base member and the vehicular frame member.

20. The vehicular mounting apparatus of claim 19 in which the elongate padding member has an exterior surface, and the protective base member protectively covers all of the exterior surface.

21. The vehicular mounting apparatus of claim 19 in which part of the protective base member is fixedly attached to the elongate padding member.

22. The vehicular mounting apparatus of claim 19 in which the protective base member has a pair of opposed slots aligned with the pair of opposed slots of the padding member.

23. The vehicular mounting apparatus of claim 19 in which the elongate padding member has a relatively resilient body compared to the protective base member.

* * * * *